US012756764B2

(12) United States Patent
Tu et al.

(10) Patent No.: US 12,756,764 B2
(45) Date of Patent: Oct. 6, 2026

(54) SEAMLESS MIGRATION OF CONTAINERS BETWEEN HOST NODES

(71) Applicant: International Business Machines Corporation, Armonk, NY (US)

(72) Inventors: Hong Jun Tu, Beijing (CN); Yiwen Huang, Markham (CA); Wen Tao Zhang, Beijing (CN); Hongsen Liu, Beijing (CN); Ye Cui, Beijing (CN); Li Gu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 18/892,883

(22) Filed: Sep. 23, 2024

(65) Prior Publication Data

US 2026/0089221 A1 Mar. 26, 2026

(51) Int. Cl.
*H04L 67/148* (2022.01)
*H04L 45/03* (2022.01)
*H04L 67/563* (2022.01)

(52) U.S. Cl.
CPC ............ *H04L 67/148* (2013.01); *H04L 45/03* (2022.05); *H04L 67/563* (2022.05)

(58) Field of Classification Search
CPC ...... H04L 67/148; H04L 67/563; H04L 45/03
See application file for complete search history.

(56) References Cited

U.S. PATENT DOCUMENTS 11,175,939 B2 11/2021 Kumatagi et al.
11,943,093 B1 * 3/2024 Brooker .............. H04L 41/0654
2013/0326507 A1 * 12/2013 McGrath ............... G06F 9/4856 718/1
2019/0095254 A1 * 3/2019 Rao ..................... G06F 9/45558
2020/0034254 A1 1/2020 Natanzon
2020/0142753 A1 * 5/2020 Harwood .............. G06F 9/4856
2020/0159556 A1 * 5/2020 Chandrappa .......... G06F 12/109
2021/0034423 A1 * 2/2021 Hallur ................. G06F 9/45558
2021/0042151 A1 2/2021 Muller et al.
2023/0224273 A1 * 7/2023 Murthy ............... H04L 61/5084 709/223

FOREIGN PATENT DOCUMENTS

CN 110750332 A 2/2020
CN 110377395 B 11/2021
CN 116668271 A 8/2023
CN 110851237 B 9/2023
EP 3510485 B1 8/2023
JP 6738960 B2 8/2020

* cited by examiner

*Primary Examiner* — Clayton R Williams
(74) *Attorney, Agent, or Firm* — Yee & Associates, P.C.

(57) ABSTRACT

Migrating containers between host nodes is provided. An indication is received that a checkpointed state of a container running an application providing at least one of a set of critical services or a set of non-critical services was transferred from a source host node to a target host node. In response to receiving the indication, a migration helper located on the target host node is directed to restore and run the container running the application providing the at least one of the set of critical services or the set of non-critical services on the target host node without interruption of the set of critical services based on the checkpointed state of the container transferred from the source host node and an internal IP address of the container that did not change during migration to the target host node.

20 Claims, 6 Drawing Sheets

SEAMLESS MIGRATION OF CONTAINERS BETWEEN HOST NODES

BACKGROUND

The disclosure relates generally to container orchestration environments and more specifically to migrating containers between host nodes of a container orchestration environment.

A container orchestration environment or platform, such as, for example, Kubernetes® (a registered trademark of the Linux Foundation of San Francisco, California, USA), provides an architecture for automating deployment, scaling, and operations of application workloads across clusters of host nodes. Typically, a container orchestration environment includes, for example, a control node, which is a main controlling unit of a cluster of host nodes (also known as worker nodes, compute nodes, minions, and the like), managing the cluster's workload, and directing communication across the cluster. A host node is a machine, either physical or virtual, where containers (i.e., application workloads) are deployed. A container holds the running application, libraries, and their dependencies for providing a service. A container image is an executable package of software that includes everything needed to run the application (e.g., code, runtime, system tools, system libraries, settings, and the like). The container image becomes the container at runtime.

The control plane of the cluster of host nodes, which the control node forms, consists of various components, such as, for example, a data store, application programming interface (API) server, scheduler, internet protocol (IP) manager, and the like. The data store contains configuration data of the cluster, representing the overall and desired state of the cluster at any given time. The API server provides internal and external interfaces for the control node. The API server processes and validates resource availability requests and updates state of objects in the data store, thereby allowing users to configure application workloads across host nodes in the cluster. The scheduler selects which host node a workload runs on based on resource availability of respective host nodes. For example, the scheduler tracks resource utilization on each host node to ensure that workload is not scheduled in excess of available resources. The IP manager assigns IP addresses to containers.

SUMMARY

According to one illustrative embodiment, a method is provided. An indication is received that a checkpointed state of a container running an application providing at least one of a set of critical services or a set of non-critical services was transferred from a source host node to a target host node. In response to receiving the indication, a migration helper located on the target host node is directed to restore and run the container running the application providing the at least one of the set of critical services or the set of non-critical services on the target host node without interruption of the set of critical services based on the checkpointed state of the container transferred from the source host node and an internal IP address of the container that did not change during migration to the target host node. According to other illustrative embodiments, a computer system and computer program product are provided.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
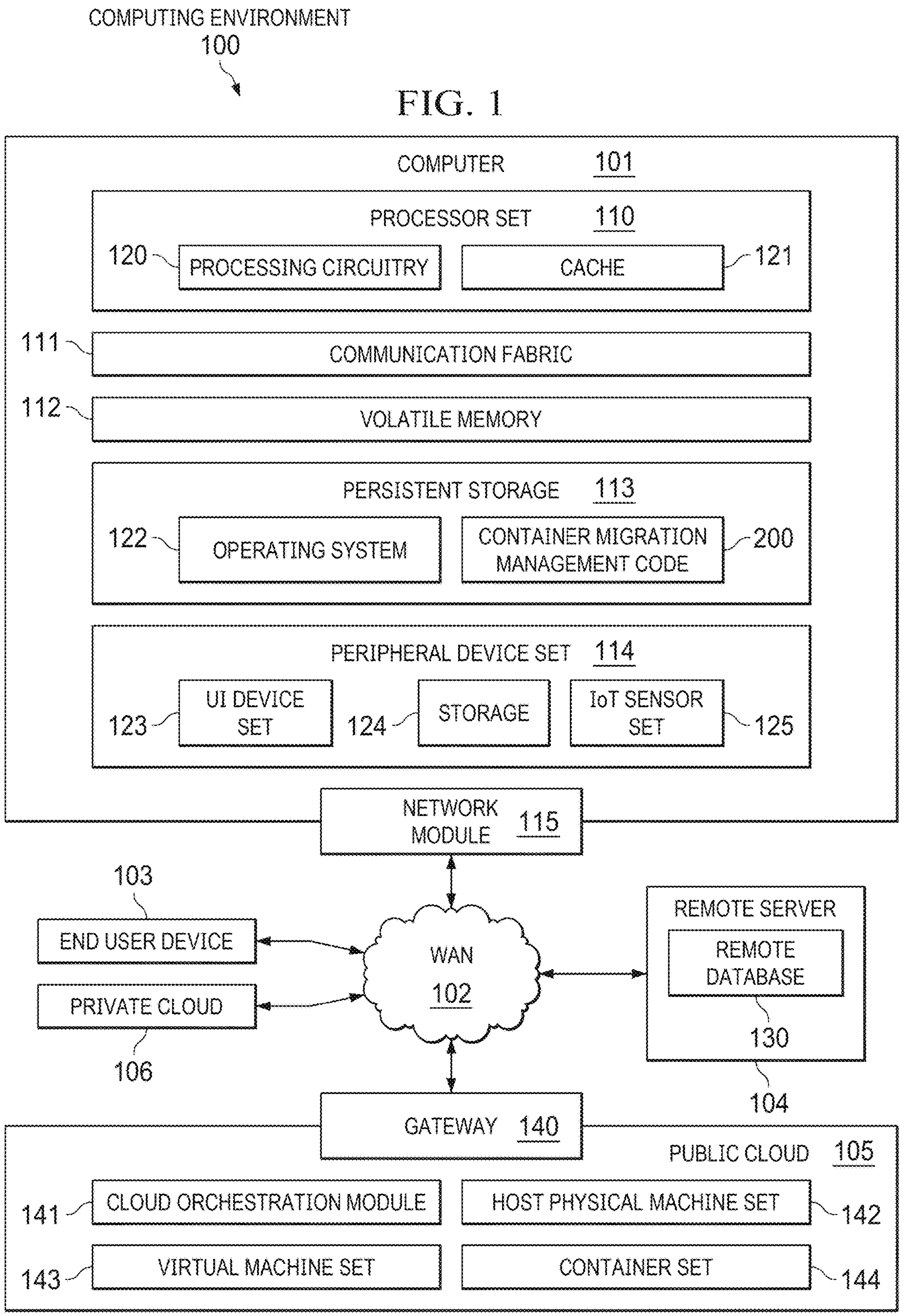
FIG. 1 is a pictorial representation of a computing environment in which illustrative embodiments may be implemented.
Figure 2:
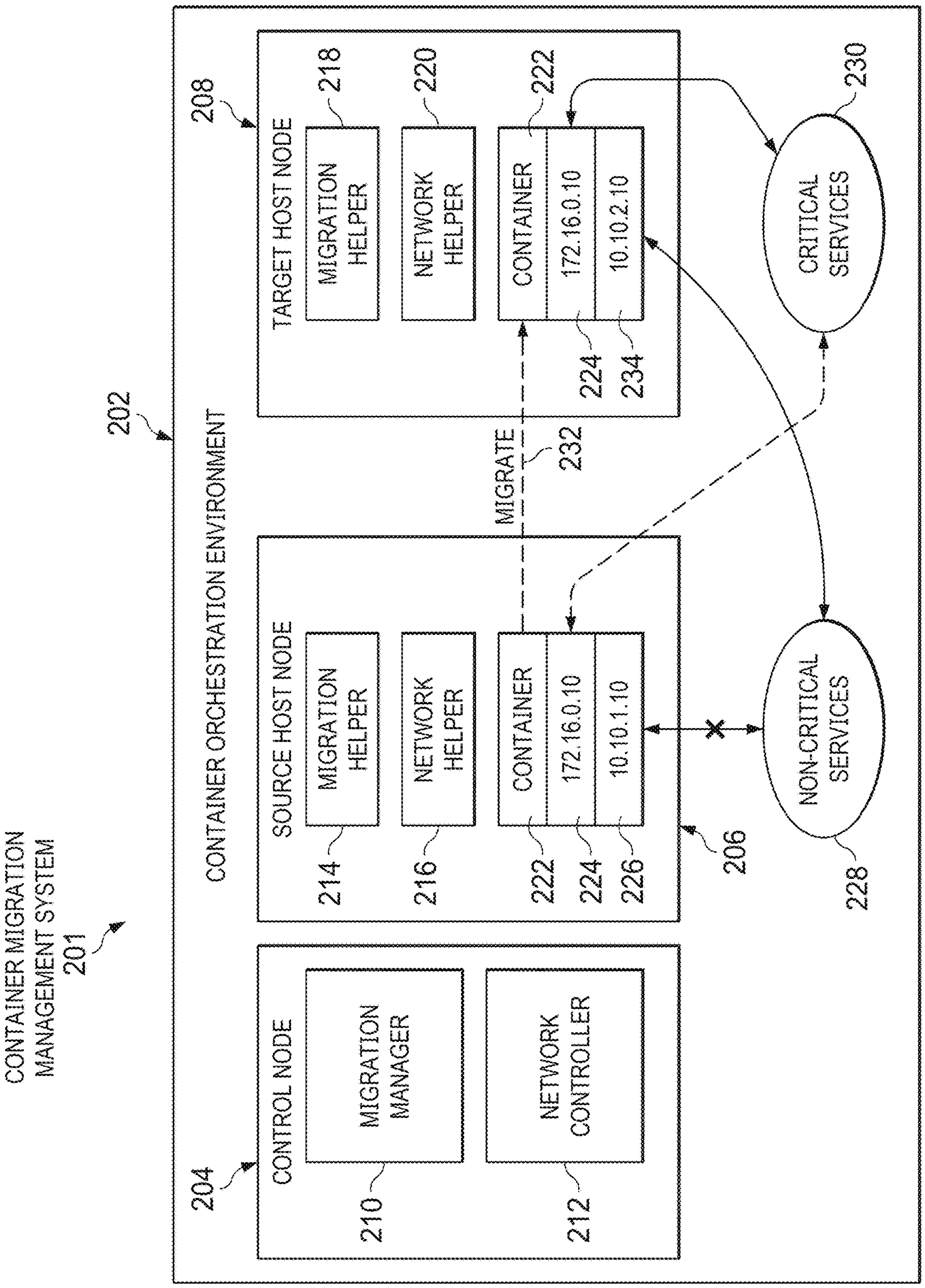
FIG. 2 is a diagram illustrating an example of a container migration management system in accordance with an illustrative embodiment.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 contains an example of a container orchestration environment for the execution of at least some of the computer code involved in performing the inventive methods of illustrative embodiments, such as container migration management code 200.

For example, container migration management code 200 utilizes a migration manager to initiate, control, and complete a live container migration process. The migration manager determines which container needs to be migrated from which source host node to which target host node in the container orchestration environment. The migration manager communicates with a migration helper located on the source host node to checkpoint the current state of the container. Checkpointing saves the current state of the container so that the container can be resumed later using the checkpointed state. The migration manager then directs the migration helper on the source host node to transfer the checkpointed state data of the container from the source host node to a target host node. Then, once the checkpointed state data of the container is received on the target host node, migration manager directs the migration helper on the target host node to restore and run the container using the checkpointed state data received from the source host node. In other words, the container starts running on the target host node from the exact same point the container was checkpointed on the source host node.

It should be noted that the container retains its internal internet protocol (IP) address during and after migration, container migration management code 200 utilizes a network controller to direct a network helper on the source host node to generate a new external floating IP address for the container and transfer the new external floating IP address to a network helper on the target host node. In addition, the network controller directs the network helper on the target host node to update a network routing table of the container orchestration environment with the new floating IP address that points to the container now running on the target host node to ensure that any future traffic directed to the floating IP address is routed to the correct host node where the container is currently running. As a result, any network traffic to the container's new external floating IP address is now directed to the container running on the target host node. With the container successfully running on the target host node and the network routing table updated, the live migration process is complete.

In addition to container migration management code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and container migration management code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a mainframe computer, quantum computer, desktop computer, laptop computer, tablet computer, or any other form of computer now known or to be developed in the future that is capable of, for example, running a program, accessing a network, and querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods of illustrative embodiments may be stored in container migration management code 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as smart glasses and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (e.g., where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer, and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (e.g., embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (e.g., the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

EUD 103 is any computer system that is used and controlled by an end user (e.g., a system administrator who utilizes the container migration management services provided by computer 101), and may take any of the forms discussed above in connection with computer 101. EUD 103 typically receives helpful and useful data from the operations of computer 101. For example, in a hypothetical case where computer 101 is designed to provide a container migration recommendation to the end user, this recommendation would typically be communicated from network module 115 of computer 101 through WAN 102 to EUD 103. In this way, EUD 103 can display, or otherwise present, the container migration recommendation to the end user. In some embodiments, EUD 103 may be a client device, such as a thin client, heavy client, mainframe computer, desktop computer, laptop computer, tablet computer, smart phone, smart glasses, smart watch, and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a container migration recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single entity. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Public cloud 105 and private cloud 106 are programmed and configured to deliver cloud computing services and/or microservices (not separately shown in FIG. 1). Unless otherwise indicated, the word "microservices" shall be interpreted as inclusive of larger "services" regardless of size. Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of application programming interfaces (APIs). One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

As used herein, when used with reference to items, "a set of" means one or more of the items. For example, a set of clouds is one or more different types of cloud environments. Similarly, "a number of," when used with reference to items, means one or more of the items. Moreover, "a group of" or "a plurality of" when used with reference to items, means two or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

In a container orchestration environment, such as, for example, Kubernetes, when a container migrates from one host node to another host node, the typical approach involves terminating the container on a source host node and then instantiating an equivalent container on a destination or target host node. However, this typical approach has issues such as the application running within the container undergoes termination and subsequent reinitialization causing service interruption or downtime.

Current migration solutions, such as, for example, Checkpoint/Restore In Userspace or CRIU® (a registered trademark of Virtuozzo International GMBH, Schaffhausen, CH), can enable live migration of containers. For example, these current migration solutions can stop a running container, checkpoint the current state of the container, and then use the checkpointed state of the container to run the container on a different host node exactly as it was when the container was checkpointed. However, the container network interface (CNI) standard of container orchestration environments creates a challenge for live container migration. For example, the CNI standard mandates that IP addresses change for containers migrating to different hosts, presenting a challenge to seamless migration of containers without service interruption. In addition, certain critical services corresponding to an entity, such as, for example, an enterprise, company, business, organization, institution, agency, or the like, may need live migration without interruption or downtime of these critical services. However, changing the IP address of the container during migration, which is mandated by the CNI standard, causes interruption of these critical services. Thus, a need exists to seamlessly migrate containers between host nodes while maintaining critical service availability.

Illustrative embodiments enable container live migration that is compatible with the CNI standard. Illustrative embodiments utilize the live migration technology of current migration solutions, such as, for example, CRIU, to perform the live migration of containers. Illustrative embodiments utilize a dual IP address setup for each container. In other words, illustrative embodiments assign two IP addresses to each container within the container orchestration environment.

Illustrative embodiments provide each container with an external floating IP address (e.g., CNI IP address) and an internal IP address. Illustrative embodiments utilize the external floating IP address for standard connections within the cluster of host nodes corresponding to the container orchestration environment. Illustrative embodiments utilize the internal IP address with its transmission control protocol (TCP)/IP stack stored in memory for the live migration of a container to another host node. Illustrative embodiments can access and change the external floating IP address according to the CNI standard, while illustrative embodiments utilize the internal IP address for the live migration of containers running critical services that an entity does not want interrupted during the container migration process.

Illustrative embodiments utilize a migration manager, which resides on a control node of the container orchestration environment, to control the live container migration process. The migration manager communicates with migration helpers and network helpers (e.g., agents) located on host nodes to ensure a smooth migration of containers between host nodes.

A migration helper is present on each host node and works in conjunction with the migration manager. The migration helper utilize the live migration technology to checkpoint and restore the state of containers. For example, the migration helper on a source host node checkpoints the current state of a container to be migrated and then transfers the checkpointed state of that container to a target host node. The migration helper on the target host node then restores and runs the container on the target host node utilizing the checkpointed state received from the migration helper on the source host node.

Illustrative embodiments utilize a network controller, which also resides on the control node of the container orchestration environment, to allocate and maintain a pool of internal IP addresses for the containers. In addition, the network controller interacts with network helpers located on host nodes to manage the external floating IP addresses. Thus, illustrative embodiments utilize the network helper located on host nodes to manage the network aspects of the live container migration. For example, the network helper generates a new external floating IP address corresponding to the container in accordance with the CNI standard during migration. However, it should be noted that unlike current migration solutions, illustrative embodiments do not set up the external floating IP address in the namespace.

Thus, illustrative embodiments provide seamless migration of containers without service downtime, ensuring continuous availability of critical services during the container migration process and enhancing overall system reliability. Illustrative embodiments also increase system performance by reducing the time and resources needed for container migration.

Thus, illustrative embodiments provide one or more technical solutions that overcome a technical problem with an inability of current container migration solutions to migrate containers in container orchestration environments without interruption of critical services. As a result, these one or more technical solutions provide a technical effect and practical application in the field of container orchestration environments.

With reference now to FIG. 2, a diagram illustrating an example of a container migration management system is depicted in accordance with an illustrative embodiment. Container migration management system 201 is implemented in container orchestration environment 202. Container orchestration environment may be, for example, computing environment 100 in FIG. 1.

Container orchestration environment 202 is a system of hardware and software components for migrating containers in a container orchestration environment without interruption of critical services. In this example, container orchestration environment 202 includes control node 204, source host node 206, and target host node 208. Control node 204 may be, for example, computer 101 in FIG. 1. Source host node 206 and target host node 208 may be, for example, machines in host physical machine set 142 or virtual machine set 143. However, it should be noted that container orchestration environment 202 is intended as an example only and not as a limitation on illustrative embodiments.

For example, container orchestration environment 202 may include any number of control nodes, host nodes, and other devices and components not shown.

Also in this example, control node 204 includes migration manager 210 and network controller 212. Migration manager 210 and network controller 212 can be implemented by container migration management code 200 in FIG. 1. In addition, source host node 206 includes migration helper 214 and network helper 216, and target host node 208 includes migration helper 218 and network helper 220.

Illustrative embodiments utilize a dual IP address setup for containers in container orchestration environment 202. In other words, illustrative embodiments assign two IP addresses to each container in container orchestration environment 202. The first IP address is an internal IP address that illustrative embodiments dynamically assign when the container is generated. This first IP address remains constant and does not change during live container migration. The second IP address is an external floating IP address. This second IP address is subject to change when the container is migrated from one host node to another in accordance with the CNI standard. For example, when control node 204 generates container 222 on source host node 206, network controller 212 assigns internal IP address 224 to container 222 as well as external floating IP address 226.

Container 222 runs an application that provides non-critical services 228 and critical services 230. Non-critical services 228 and critical services 230 correspond to a client entity. Non-critical services 228 are a set of standard services of the client entity that the client entity is not concerned with whether these standard services are interrupted during a container migration process. Non-critical services 228 correspond to external floating IP address 226, which changes during container migration in accordance with the CNI standard. Critical services 230 are a set of non-interruptible essential services of the client entity that the client entity does not want interrupted during the container migration process. Critical services 230 correspond to internal IP address 224, which does not change during container migration.

At 232, control node 204 receives an input to migrate container 222 from source host node 206 to target host node 208. In response to control node 204 receiving the input to migrate container 222, migration manager 210 directs migration helper 214 on source host node 206 to checkpoint the current state of container 222 on source host node 206. Checkpointing includes saving, for example, the current execution state of the container, as well as the memory state, network connections, and any other relevant data corresponding to container 222.

After the current state of container 222 on source host node 206 is checkpointed, migration manager 210 directs migration helper 214 on source host node 206 to migrate the checkpointed state of container 222 to target host node 208 from source host node 206. Once the checkpointed state of container 222 is received by target host node 208, migration manager 210 directs migration helper 218 on target host node 208 to restore and run container 222 on target host node 208 utilizing the checkpointed state data of container 222. As a result, container 222 starts running on target host node 208 from the exact same point container 222 was checkpointed on source host node 206.

Further, network controller 212 directs network helper 216 on source host node 206 to generate new external floating IP address 234 for container 222 based on the CNI standard. Furthermore, network controller 212 directs network helper 216 on source host node 206 to transfer new external floating IP address 234 to target host node for use by container 222. Moreover, network controller 212 directs network helper 220 on target host node 208 to update the network routing table of container orchestration environment 202 to reflect the new location of container 222 on target host node 208. It should be noted that container 222 on target host node 208 retains internal IP address 224.

After the migration process is complete, container 222 continues to run on target host node 208. Retaining internal IP address 224 as before, ensures seamless network connectivity for critical services 230 provided by container 222 during migration. Even though external floating IP address 226 of container 222 changed to new external floating IP address 234 during migration, this external floating IP address change does not affect existing network connections as the existing network connections are associated with internal IP address 224.

Figure 3:
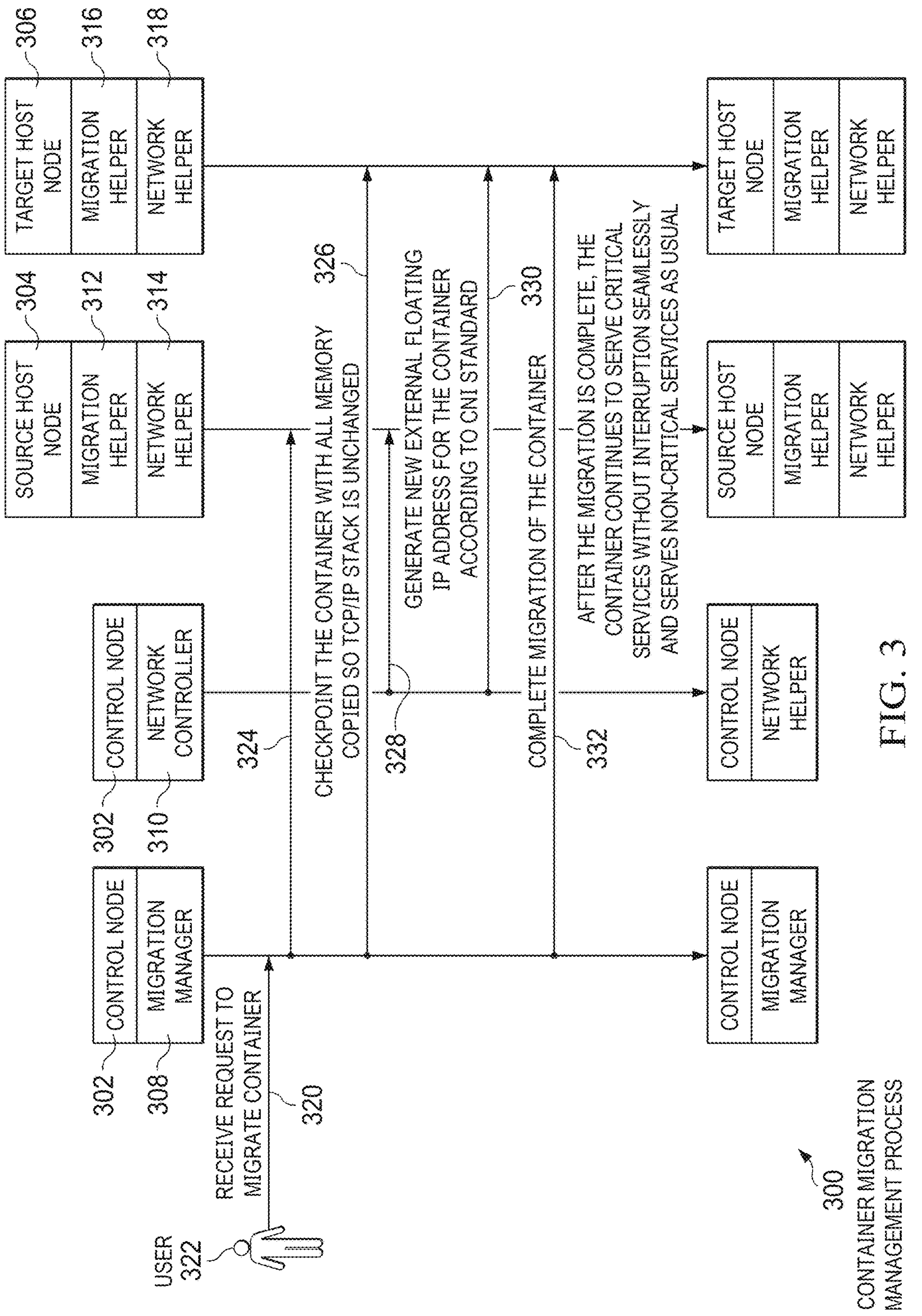
FIG. 3 is a diagram illustrating an example of a container migration management process in accordance with an illustrative embodiment.

With reference now to FIG. 3, a diagram illustrating an example of a container migration management process is depicted in accordance with an illustrative embodiment. Container migration management process 300 may be implemented in container orchestration environment, such as, for example, container orchestration environment 202 in FIG. 2.

In this example, container migration management process 300 includes control node 302, source host node 304, and target host node 306. Control node 302, source host node 304, and target host node 306 can be, for example, control node 204, source host node 206, and target host node 208 in FIG. 2. Control node 302 includes migration manager 308 and network controller 310. Source host node 304 includes migration helper 312 and network helper 314. Target host node 306 includes migration helper 316 and network helper 318.

At 320, control node 302 receives a request to migrate a container from user 322. The container may be, for example, container 222 in FIG. 2. User 322 may be, for example, an end user of EUD 103 in FIG. 1.

At 324, migration manager 308 directs migration helper 312 to checkpoint the container with all memory copied so that the TCP/IP stack is unchanged. At 326, migration manager 308 directs migration helper 312 to transfer checkpointed data corresponding to the container from source host node 304 to target host node 306.

In addition, at 328, network controller 310 directs network helper 314 to generate a new external floating IP address for the container according to the CNI standard. The new external floating IP address may be, for example, new external floating IP address 234 in FIG. 2. At 330, network controller 310 directs network helper 314 to transfer the new external floating IP address for the container to network helper 318 of target host node 306.

At 334, migration manager 308 completes the migration of the container to target host node 306. After the migration is complete, the container continues to server critical services, such as critical services 230 in FIG. 2, without interruption seamlessly and serves non-critical services, such as non-critical services 228 in FIG. 2, as usual.

Figure 4:
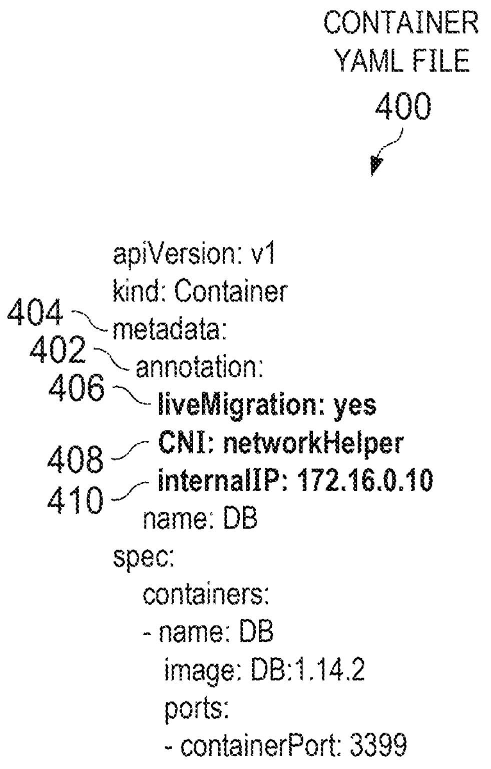
FIG. 4 is a diagram illustrating an example of a container YAML file in accordance with an illustrative embodiment.

With reference now to FIG. 4, a diagram illustrating an example of a container YAML file is depicted in accordance with an illustrative embodiment. Container YAML file 400. Container YAML file 400 corresponds to a container, such as container 222 in FIG. 2.

In this example, container YAML file 400 includes annotation 402 in metadata 404. Annotation 402 contains live migration 406, CNI 408, and internal IP 410. Live migration 406 indicates whether live migration of the container is enabled or not. In this example, live migration is enabled, which is indicated by "yes." CNI 408 indicates that a network helper, such as network helper 314 in FIG. 3, is to generate a new external floating IP address, such as new external floating IP address 234 in FIG. 2, for the container during the live migration process in accordance with the CNI standard. Internal IP 410 indicates that the container is to retain the internal IP address, such as internal IP address 224 in FIG. 2, during the live migration process.

Figure 5A:
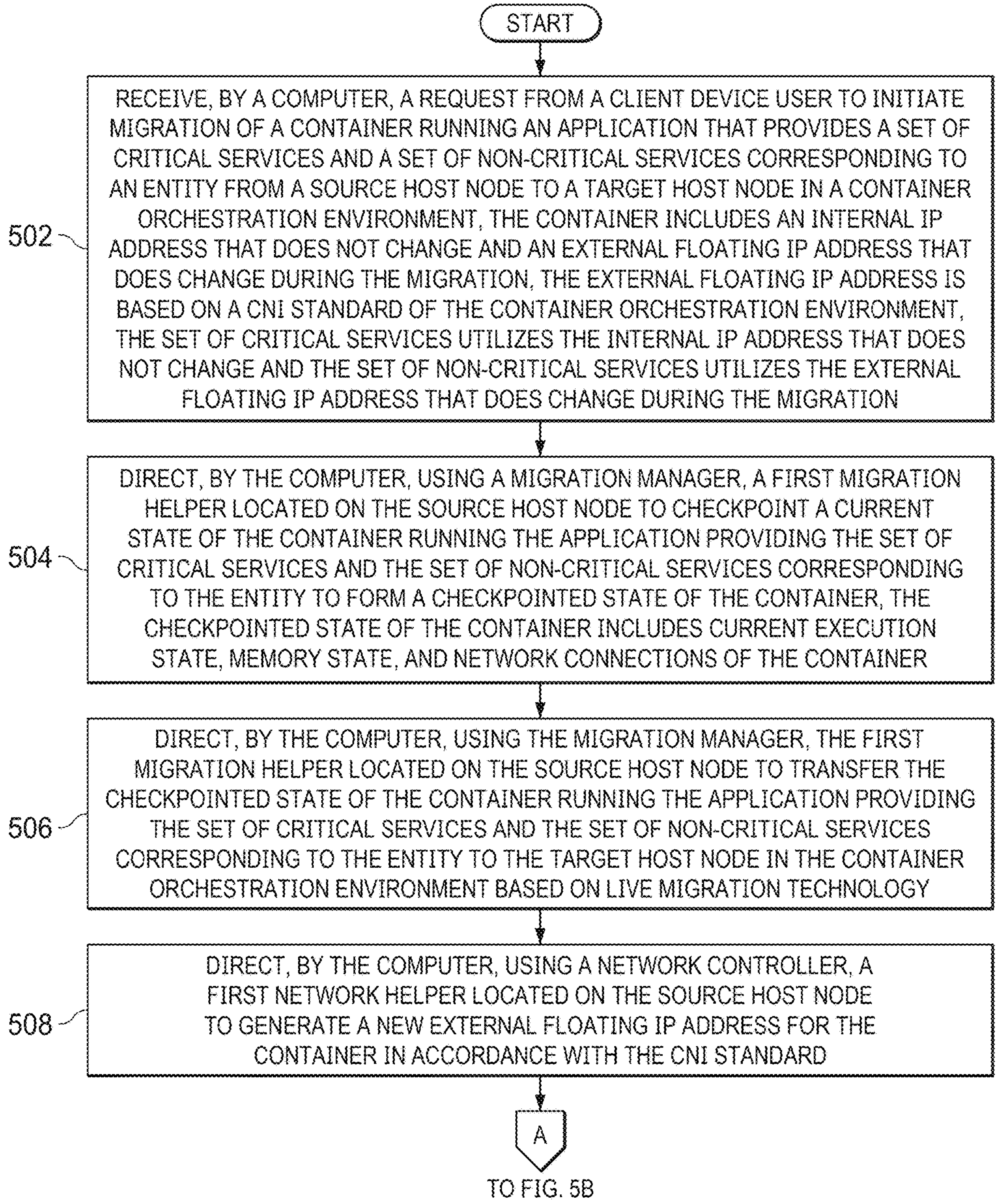
FIGS. 5A-5B are a flowchart illustrating a process for managing container migration in accordance with an illustrative embodiment.
Figure 5B:
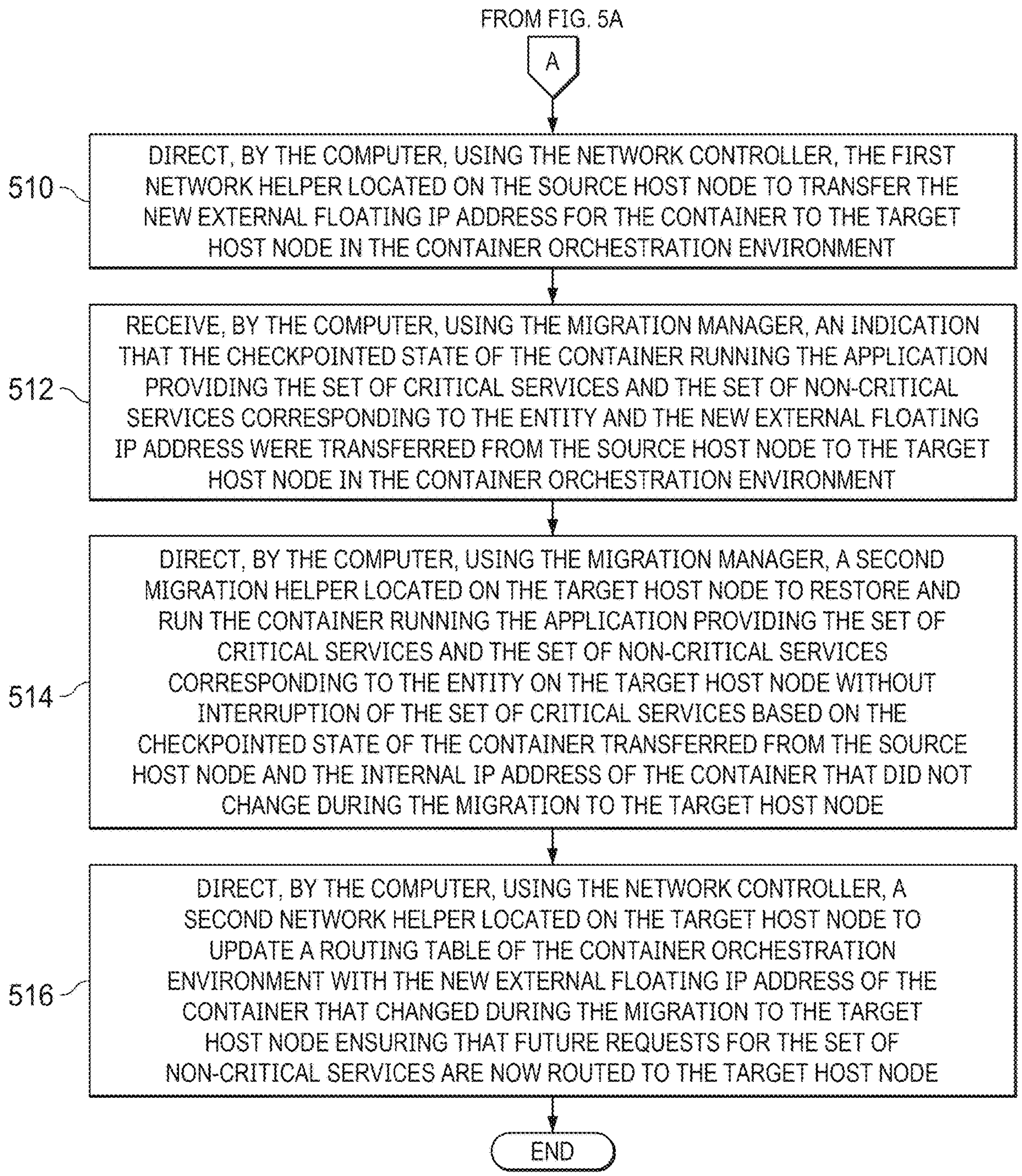

With reference now to FIGS. 5A-5B, a flowchart illustrating a process for managing container migration is shown in accordance with an illustrative embodiment. The process shown in FIGS. 5A-5B may be implemented in a computer, such as, for example, computer 101 in FIG. 1 or control node 204 in FIG. 2. For example, the process shown in FIGS. 5A-5B may be implemented by container migration management code 200 in FIG. 1.

The process begins when the computer receives a request from a client device user to initiate migration of a container running an application that provides a set of critical services and a set of non-critical services corresponding to an entity from a source host node to a target host node in a container orchestration environment (step 502). The container includes an internal IP address that does not change and an external floating IP address that does change during the migration. The external floating IP address is based on a CNI standard. The set of critical services utilizes the internal IP address that does not change, and the set of non-critical services utilizes the external floating IP address that does change during the migration.

The computer, using a migration manager, directs a first migration helper located on the source host node to checkpoint a current state of the container running the application providing the set of critical services and the set of non-critical services corresponding to the entity to form a checkpointed state of the container (step 504). The checkpointed state of the container includes current execution state, memory state, and network connections of the container. Afterward, the computer, using the migration manager, directs the first migration helper located on the source host node to transfer the checkpointed state of the container running the application providing the set of critical services and the set of non-critical services corresponding to the entity to the target host node in the container orchestration environment based on live migration technology (step 506).

In addition, the computer, using a network controller, directs a first network helper located on the source host node to generate a new external floating IP address for the container in accordance with the CNI standard (step 508). The computer, using the network controller, then directs the first network helper located on the source host node to transfer the new external floating IP address for the container to the target host node in the container orchestration environment (step 510).

Subsequently, the computer, using the migration manager, receives an indication that the checkpointed state of the container running the application providing the set of critical services and the set of non-critical services corresponding to the entity and the new external floating IP address were transferred from the source host node to the target host node in the container orchestration environment (step 512). In response to receiving the indication, the computer, using the migration manager, directs a second migration helper located on the target host node to restore and run the container running the application providing the set of critical services and the set of non-critical services corresponding to the entity on the target host node without interruption of the set of critical services based on the checkpointed state of the container transferred from the source host node and the internal IP address of the container that did not change during the migration to the target host node (step 514). Further, the computer, using the network controller, directs a second network helper located on the target host node to update a routing table of the container orchestration environment with the new external floating IP address pointing to the container running the application providing the set of non-critical services corresponding to the entity on the target host node to ensure that future requests for the set of non-critical services are now routed to the target host node (step 516).

Thus, illustrative embodiments of the present disclosure provide a computer-implemented method, computer system, and computer program product for managing migration of containers between host nodes in a container orchestration environment without critical service interruption using internal IP addresses of the containers. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

receiving an indication that a checkpointed state of a container running an application providing at least one of a set of critical services or a set of non-critical services was transferred from a source host node to a target host node, wherein the checkpointed state comprises active network connections of the container and a transmission control protocol (TCP/IP) stack of the container stored in memory; and responsive to receiving the indication, directing a migration helper located on the target host node to restore and run the container running the application providing the at least one of the set of critical services or the set of non-critical services on the target host node without interruption of the set of critical services based on the checkpointed state of the container transferred from the source host node and an internal IP address of the container that did not change during migration to the target host node, such that remote endpoints of the active network connections do not experience a connection interruption during migration to the target host node;

wherein the container includes the internal IP address that does not change during migration and an external floating IP address that is a network-layer address assigned by a container network interface (CNI) plugin of a container orchestration environment in accordance with a CNI standard, the external floating IP address changing during migration from the source host node to the target host node.

2. The method of claim 1, further comprising:

directing a network helper located on the target host node to update a routing table with a new external floating IP address of the container that changed during the migration to the target host node ensuring that future requests for the set of non-critical services are routed to the target host node.

3. The method of claim 1, further comprising:

directing a migration helper located on the source host node to checkpoint a current state of the container running the application providing the at least one of the set of critical services or the set of non-critical services to form the checkpointed state of the container; and directing the migration helper located on the source host node to transfer the checkpointed state of the container running the application providing the at least one of the set of critical services or the set of non-critical services to the target host node based on live migration technology.

4. The method of claim 1, further comprising:

directing a network helper located on the source host node to generate a new external floating IP address for the container in accordance with a container network interface standard; and directing the network helper located on the source host node to transfer the new external floating IP address for the container to the target host node.

5. The method of claim 1, further comprising:

receiving a request from a client device user to initiate the migration of the container running the application that provides the at least one of the set of critical services or the set of non-critical services corresponding to an entity from the source host node to the target host node in a container orchestration environment, the container includes the internal IP address that does not change and an external floating IP address that does change during the migration from the source host node to the target host node, the external floating IP address is based on a container network interface standard of the container orchestration environment.

6. The method of claim 5, wherein the set of critical services utilizes the internal IP address that does not change and the set of non-critical services utilizes the external floating IP address that does change during the migration from the source host node to the target host node.

7. The method of claim 1, wherein the checkpointed state of the container includes current execution state, memory state, and network connections of the container.

8. A computer system comprising:

a processor set;

one or more computer-readable storage media; and program instructions stored on the one or more computer-readable storage media to cause the processor set to perform operations comprising:

receiving an indication that a checkpointed state of a container running an application providing at least one of a set of critical services or a set of non-critical services was transferred from a source host node to a target host node, wherein the checkpointed state comprises active network connections of the container and a transmission control protocol (TCP)/IP stack of the container stored in memory; and responsive to receiving the indication, directing a migration helper located on the target host node to restore and run the container running the application providing the at least one of the set of critical services or the set of non-critical services on the target host node without interruption of the set of critical services based on the checkpointed state of the container transferred from the source host node and an internal IP address of the container that did not change during migration to the target host node, such that remote endpoints of the active network connections do not experience a connection interruption during migration to the target host node;

wherein the container includes the internal IP address that does not change during migration and an external floating IP address that is a network-layer address assigned by a container network interface (CNI) plugin of a container orchestration environment in accordance with a CNI standard, the external floating IP address changing during migration from the source host node to the target host node.

9. The computer system of claim 8, wherein the operations further comprise:

directing a network helper located on the target host node to update a routing table with a new external floating IP address of the container that changed during the migration to the target host node ensuring that future requests for the set of non-critical services are routed to the target host node.

10. The computer system of claim 8, wherein the operations further comprise:

directing a migration helper located on the source host node to checkpoint a current state of the container running the application providing the at least one of the set of critical services or the set of non-critical services to form the checkpointed state of the container; and directing the migration helper located on the source host node to transfer the checkpointed state of the container running the application providing the at least one of the set of critical services or the set of non-critical services to the target host node based on live migration technology.

11. The computer system of claim 8, wherein the operations further comprise:

directing a network helper located on the source host node to generate a new external floating IP address for the container in accordance with a container network interface standard; and directing the network helper located on the source host node to transfer the new external floating IP address for the container to the target host node.

12. The computer system of claim 8, wherein the operations further comprise:

receiving a request from a client device user to initiate the migration of the container running the application that provides the at least one of the set of critical services or the set of non-critical services corresponding to an entity from the source host node to the target host node in a container orchestration environment, the container includes the internal IP address that does not change and an external floating IP address that does change during the migration from the source host node to the target host node, the external floating IP address is based on a container network interface standard of the container orchestration environment.

13. The computer system of claim 12, wherein the set of critical services utilizes the internal IP address that does not change and the set of non-critical services utilizes the external floating IP address that does change during the migration from the source host node to the target host node.

14. A computer program product comprising:

one or more computer-readable storage media; and program instructions stored on the one or more computer-readable storage media to perform operations comprising:

receiving an indication that a checkpointed state of a container running an application providing at least one of a set of critical services or a set of non-critical services was transferred from a source host node to a target host node, wherein the checkpointed state comprises active network connections of the container and a transmission control protocol (TCP)/IP stack of the container stored in memory; and responsive to receiving the indication, directing a migration helper located on the target host node to restore and run the container running the application providing the at least one of the set of critical services or the set of non-critical services on the target host node without interruption of the set of critical services based on the checkpointed state of the container transferred from the source host node and an internal IP address of the container that did not change during migration to the target host node, such that remote endpoints of the active network connections do not experience a connection interruption during migration to the target host node;

wherein the container includes the internal IP address that does not change during migration and an external floating IP address that is a network-layer address assigned by a container network interface (CNI) plugin of a container orchestration environment in accordance with a CNI standard, the external floating IP address changing during migration from the source host node to the target host node.

15. The computer program product of claim 14, wherein the operations further comprise:

directing a network helper located on the target host node to update a routing table with a new external floating IP address of the container that changed during the migration to the target host node ensuring that future requests for the set of non-critical services are routed to the target host node.

16. The computer program product of claim 14, wherein the operations further comprise:

directing a migration helper located on the source host node to checkpoint a current state of the container running the application providing the at least one of the set of critical services or the set of non-critical services to form the checkpointed state of the container; and directing the migration helper located on the source host node to transfer the checkpointed state of the container running the application providing the at least one of the set of critical services or the set of non-critical services to the target host node based on live migration technology.

17. The computer program product of claim 14, wherein the operations further comprise:

directing a network helper located on the source host node to generate a new external floating IP address for the container in accordance with a container network interface standard; and directing the network helper located on the source host node to transfer the new external floating IP address for the container to the target host node.

18. The computer program product of claim 14, wherein the operations further comprise:

receiving a request from a client device user to initiate the migration of the container running the application that provides the at least one of the set of critical services or the set of non-critical services corresponding to an entity from the source host node to the target host node in a container orchestration environment, the container includes the internal IP address that does not change and an external floating IP address that does change during the migration from the source host node to the target host node, the external floating IP address is based on a container network interface standard of the container orchestration environment.

19. The computer program product of claim 18, wherein the set of critical services utilizes the internal IP address that does not change and the set of non-critical services utilizes the external floating IP address that does change during the migration from the source host node to the target host node.

20. The computer program product of claim 14, wherein the checkpointed state of the container includes current execution state, memory state, and network connections of the container.

* * * * *